(12) United States Patent
Trenary et al.

(10) Patent No.: US 7,190,847 B2
(45) Date of Patent: Mar. 13, 2007

(54) METHOD, SYSTEM, AND PROGRAM FOR FRACTIONALLY SHIFTING DATA SUBJECT TO A PREVIOUS TRANSFORMATION

(75) Inventors: Timothy James Trenary, Bethoud, CO (US); Joan LaVerne Mitchell, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 1052 days.

(21) Appl. No.: 10/075,049

(22) Filed: Feb. 12, 2002

(65) Prior Publication Data

US 2003/0152282 A1     Aug. 14, 2003

(51) Int. Cl.
G06K 9/32      (2006.01)
G06K 9/36      (2006.01)
G06K 9/00      (2006.01)

(52) U.S. Cl. .................. 382/299; 382/235; 382/166; 382/167

(58) Field of Classification Search ................ 382/166, 382/167, 232–235, 293, 299
See application file for complete search history.

(56) References Cited

U.S. PATENT DOCUMENTS

| | | | |
|---|---|---|---|
| 4,912,668 | A | 3/1990 | Aubie et al. |
| 5,274,449 | A | 12/1993 | Keesen |
| 5,442,399 | A | 8/1995 | Asamura et al. |
| 5,572,236 | A | 11/1996 | Feig et al. |
| 5,774,206 | A | 6/1998 | Wasserman et al. |
| 6,452,969 | B1 * | 9/2002 | Yim ...................... 375/240.02 |

FOREIGN PATENT DOCUMENTS

JP          10003539          1/1998

OTHER PUBLICATIONS

Haskell, Barry, Atal Puri and Arun N. Netravali. *Digital Video: An Introduction to MPEG-2* (Digital Multimedia Standards Series). Chapter 5, "Video Basics," pp. 80-99, 1996.

*MPEG Video Compression Standard* (Digital Multimedia Series). Edited by Joan L. Mitchell, W.B. Pennebaker, C.E. Fogg and D.J. LeGall. Ch. 9, pp. 173-183. New York: Chapman & Hall, 1997.

Pennebaker, William B. and J.L. Mitchell. *JPEG Still Image Data Compression Standard*. Chapter 2, pp. 9-13. New York: Van Nostrand, 1993.

Pennebaker, William B. and J.L. Mitchell. *JPEG Still Image Data Compression Standard*, Chapter 2, pp. 18-22 and Chapter 3, pp. 23-25. New York: Van Nostrand, 1993.

Pennebaker, William B. and J.L. Mitchell. *JPEG Still Image Data Compression Standard*, Chapter 4, pp. 29-43. New York: Van Nostrand, 1993.

* cited by examiner

*Primary Examiner*—Jingge Wu
*Assistant Examiner*—Wes Tucker
(74) *Attorney, Agent, or Firm*—David W. Victor; Konrad Raynes & Victor LLP

(57) ABSTRACT

Provided are a method, system and program for fractionally shifting input data subject to a first transform process without first applying an inverse transformation by using a second transform process. The second transform process applies a transformed matrix to the transformed data. At least one transformed matrix is provided in non-volatile storage, wherein each transformed matrix is generated by applying the first transform process to a fractional shift matrix operator. The input data that was transformed using the first transform process is received and the at least one transformed matrix is applied to the transformed input data to generate transformed data that represents fractionally shifted transformed output data.

42 Claims, 7 Drawing Sheets

FIG. 1a
(Prior Art)
FIG. 1b
(Prior Art)
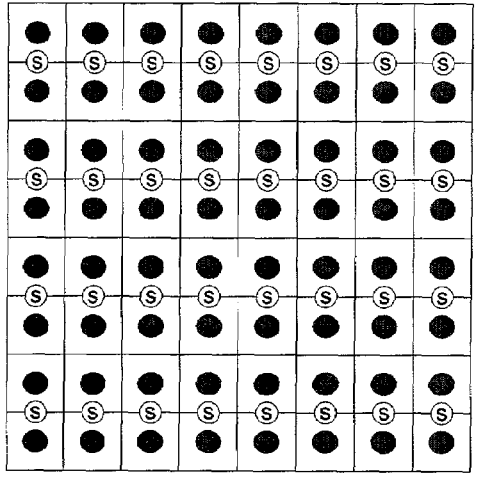
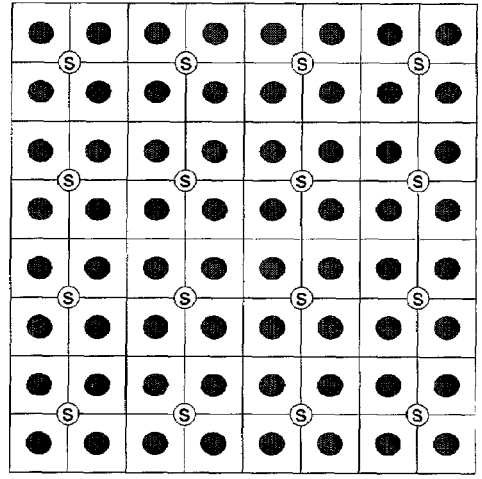
FIG. 1c
(Prior Art)
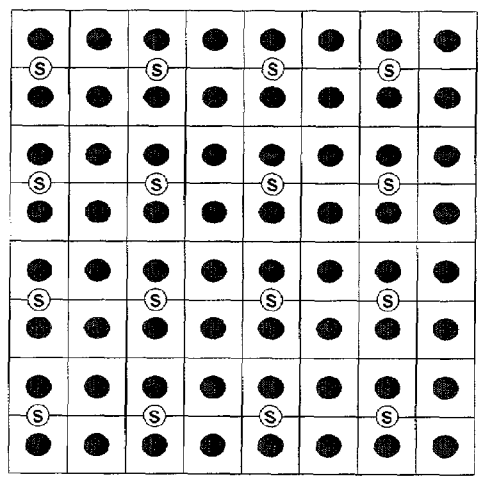

FIG. 2 (Prior Art)

$$A \begin{pmatrix} \gamma & 1-\gamma & 0 & 0 & 0 & 0 & 0 & 0 \\ 0 & \gamma & 1-\gamma & 0 & 0 & 0 & 0 & \cdot \\ 0 & 0 & \gamma & 1-\gamma & 0 & 0 & 0 & \cdot \\ 0 & 0 & 0 & \gamma & 1-\gamma & 0 & 0 & \cdot \\ 0 & 0 & 0 & 0 & \gamma & 1-\gamma & 0 & \cdot \\ 0 & 0 & 0 & 0 & 0 & \gamma & 1-\gamma & 0 \\ 0 & 0 & 0 & 0 & 0 & 0 & \gamma & 1-\gamma \\ 0 & 0 & 0 & 0 & 0 & 0 & 0 & \gamma \end{pmatrix}$$

$$B \begin{pmatrix} 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 1-\gamma & 0 & 0 & 0 & 0 & 0 & 0 & 0 \end{pmatrix}$$

$$C \begin{pmatrix} \gamma & 1-\gamma & 0 & 0 & 0 & 0 & 0 & 0 \\ 0 & \gamma & 1-\gamma & 0 & 0 & 0 & 0 & 0 \\ 0 & 0 & \gamma & 1-\gamma & 0 & 0 & 0 & 0 \\ 0 & 0 & 0 & \gamma & 1-\gamma & 0 & 0 & 0 \\ 0 & 0 & 0 & 0 & \gamma & 1-\gamma & 0 & 0 \\ 0 & 0 & 0 & 0 & 0 & \gamma & 1-\gamma & 0 \\ 0 & 0 & 0 & 0 & 0 & 0 & \gamma & 1-\gamma \\ 0 & 0 & 0 & 0 & 0 & 0 & 0 & 1 \end{pmatrix}$$

FIG. 5

$$80 \quad \begin{pmatrix} q_{11}/q_{21} & q_{12}/q_{21} & \ldots & q_{18}/q_{21} \\ q_{11}/q_{22} & q_{12}/q_{22} & \ldots & q_{18}/q_{22} \\ \vdots & \vdots & & \vdots \\ q_{11}/q_{28} & q_{12}/q_{28} & \ldots & q_{18}/q_{28} \end{pmatrix}$$

METHOD, SYSTEM, AND PROGRAM FOR FRACTIONALLY SHIFTING DATA SUBJECT TO A PREVIOUS TRANSFORMATION

BACKGROUND OF THE INVENTION

1. Field of the Invention

The present invention relates to a method, system and program for fractionally shifting data subject to a previous transformation.

2. Description of the Related Art

Digital images may use one or more bits to describe the color intensity at each pixel. The term "pixel" or "pel" as used herein refers to one or more intensity (luminance) and color (chrominance) inputs or bit values at a data point that represents data to be rendered (i.e., printed, displayed, etc.), where the data to be rendered may include, but is not limited to, images, text, composite images, graphs, collages, scientific data, video, etc. The pixels that represent an image in uncompressed format are arranged in a bit map data structure.

To conserve storage space and improve transmission speed, the chrominance component of image data is often reduced in the image because the eye is not that sensitive to color changes. However, luminance information may not be removed at the same rate as chrominance data because the eye is more sensitive to changes in the luminance intensity than the chrominance intensity. For example, to eliminate chrominance data, the digital image processor algorithm may express the chrominance for a group of neighboring pixels as a single chrominance value, which may comprise the average chrominance of surrounding pixels. This process is referred to as down sampling the chrominance. FIG. 1a illustrates how each two-by-one block of chrominance samples, where each sample is represented by a block with a blackened circle ("•"), can be downsampled and represented with a single chrominance value, represented by the circled "S". This down sampling technique reduces the chrominance portion of the image at a ratio of 2:1. FIG. 1b illustrates a further down sampling that reduces the chrominance by a ratio of 4:1.

In digital image processing, a shift operation is commonly used to shift a portion of the image by translating a group of pixels in one or more rows or columns by one or more whole pixels in the horizontal and/or vertical directions. With prior art chrominance downsampling methods, an image's chrominance data may be stored in an initial image file on a particular grid while a second image file representing the same image has the chrominance data stored on a different grid, which is not aligned with the initial grid but is rather a translation of the first grid by fractions of the original grid units. FIG. 1b shows a downsampling of chrominance values "S" from the chrominance values provided in FIG. 1a. FIG. 1c shows the same image as FIG. 1b with the chrominance shifted to the left a half a grid unit, which comprises a fractional shift of the downsampled data in FIG. 1b (i.e., a quarter of the distance between chrominance samples.).

The fractional shift operation is a technique used in digital image processing operations such as motion detection, arbitrary rotation, scaling and translation. Fractional shifting is used to convert between different image sampling formats and improve the appearance of color images that have experienced chrominance reduction as part of a reduction or downsampling operation. When reproducing an image that has experienced chrominance downsampling, the image processor must reconstruct the chrominance values for all the down sampled pixels, e.g., the black dots shown in FIGS. 1a, b, c. This process is otherwise referred to as upsampling the chrominance pels to a higher sampling frequency. One technique for upsampling is to replicate the chrominance downsamples "S" to all the neighboring pixels replaced by the downsample "S", e.g., the four black dots are replaced by the downsampled "S" in FIG. 1b.

One implementation of fractional pel shifting is conversion between MPEG-1 chrominance data sampled with a 4:2:0 scheme as shown in FIG. 1b (MPEG-1 in FIG. 9.1) and MPEG-2 chrominance data sampled with the same 4:2:0 scheme as shown in FIG. 1c (MPEG-2 in FIG. 9.1). The MPEG-2 chrominance samples are situated on a grid which is identical to the MPEG-1 chrominance sample grid with the exception that the grid is shifted ½ original units left. Thus, in order to convert an MPEG-1 image of this type to an MPEG-2 image of this type a fractional shift is needed. The original block or bitmap of the chrominance component of pixel data that will be fractionally shifted can be viewed as a matrix of the chrominance values. Further details of MPEG compression are described in the book "MPEG: Video Compression Standard", by J. L. Mitchell, W. B. Pennebaker, C. E. Fogg, and D. J. LeGall (Copyright 1997, Chapman & Hall), which publication is incorporated herein by reference in its entirety.

Since a fractional shift on two axes can be achieved by two separate one-dimensional fractional shifts, each on one axis, we consider only one-dimensional fractional shifts. Furthermore, a one-dimensional fractional shift of an entire two-dimensional grid of data can be achieved by performing a one-dimensional fractional shift on each row or column of data in that grid. Thus, we consider only the case where a fractional shift is desired on a row (column) of data. For the purposes of exposition, we assume that this row (column) of data samples can be grouped into m blocks, each block consisting of eight data samples. That is, the row (column) is divided into m 1 by 8 (or 8 by 1) vectors with the ith vector being referred to as $G_i$. Thus, the vector $G_i$ includes the following elements ($G_{i,1}, G_{i,2} \ldots G_{i,8}$).

The fractional shift matrix operation utilizes up to three matrices A, B, C, whose values are shown in FIG. 2. Matrices A, B, C are 8×8 matrices. The variable $\gamma$ in the A, B, C matrices is the amount of the fractional pel shift, where $\gamma$ is between 0 and 1. The shifted data is comprised of a matrix of row (column) vectors $H_i$, that can be determined by the following equations (1) and (2) below, that use the matrices A, B, C shown in FIG. 2 in a matrix multiplication operation ("·"):

$$H_k = A \cdot G_k + B \cdot G_{k+1} \text{ for } k=1, 2, \ldots, m-1 \quad (1)$$

$$H_m = C \cdot G_m \quad (2)$$

Additional implementations of a fractional pel shift different than those described above may also be utilized. One benefit of the above prior art fractional shift transform process is that a color image which has chrominance samples on a grid different than a specific implementation in a decoding program can have the chrominance samples first shifted to the appropriate grid and correctly decoded so as to avoid visually obvious shifts in the chrominance data which would otherwise occur.

Notwithstanding, there is a need in the art to provide improved techniques for performing a fractional shift transform process.

SUMMARY OF THE PREFERRED EMBODIMENTS

Provided is a method, system, and program for performing a fractional shift of transformed data. At least one fractional shift transform matrix is provided in non-volatile storage that is capable of fractionally shifting data by a shift factor. The transformed data is received and the at least one fractional shift transform matrix is applied to the transformed data to generate output transformed data that is fractionally shifted by the shift factor without inverse transforming the transformed data.

In further implementations, the transform is the Forward Discrete Cosine Transform (FDCT).

In further implementations, the input data stream includes data that has been downsampled and the first transform process performs upsampling on the downsampled data. Still further, the input data stream may comprise an image and the down sampling eliminated data.

The described implementations provide a technique for fractionally shifting transformed data by a shift factor without having to inverse transform the data from the transform domain before applying the fractional shift and then forward transform the fractionally shifted data.

BRIEF DESCRIPTION OF THE DRAWINGS

Referring now to the drawings in which like reference numbers represent corresponding parts throughout:

FIG. 1 illustrates a prior art technique for down sampling pixel data;

FIG. 2 illustrates prior art matrices used to perform a fractional shift operation on pixel data;

FIG. 5 illustrates an example of a matrix used to include quantization factors in the shifting operation in accordance with implementations of the invention;

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Performance Disadvantages of Current JPEG Compression Techniques

Figure 3:
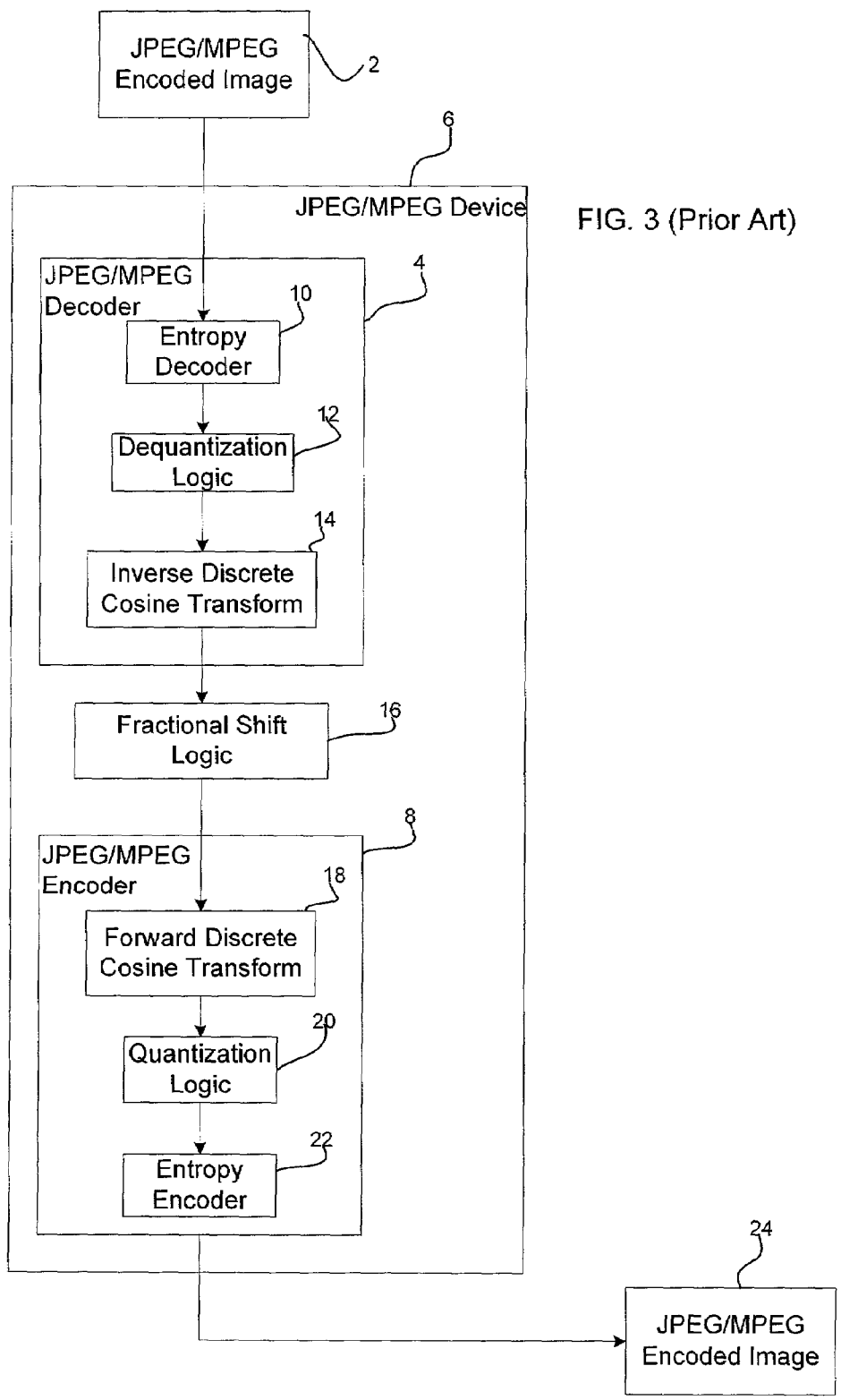
FIG. 3 illustrates a prior art technique for performing a fractional shift on JPEG/MPEG encoded data.

FIG. 3 illustrates the prior art process for JPEG and independent frame MPEG encoding data. A JPEG or MPEG (JPEG/MPEG) encoded image 2 whose pixels have been subject to chrominance down sampling, as described above with respect to FIGS. 1a, b, c, is provided to a JPEG/MPEG decoder 4 within a JPEG/MPEG device 6. The JPEG/MPEG device 6 may be implemented as software executed by a processor or a digital hardware device, such as an Application Specific Integrated Circuit (ASIC). The JPEG/MPEG device 6 includes both a JPEG/MPEG decoder 4 and JPEG/MPEG encoder 8. To decompress data, the JPEG/MPEG decoder 4 includes entropy decoder logic 10, dequantization logic 12, and an inverse discrete cosine transform (IDCT) logic 14 to decode a JPEG/MPEG encoded image in a manner known in the art. The logical components of the JPEG/MPEG decoder 4 perform the decoding of the JPEG/MPEG data to produce uncompressed pixel data, that includes the downsampled chrominance values. This uncompressed data is then sent to the fractional shift logic 16 that uses the matrix transform operation described above with respect to equations (1) and (2) to shift the chrominance samples onto a desired grid. The pixel data including the shifted chrominance values is then provided to the JPEG/MPEG encoder 8, that includes forward discrete cosine transform logic 18, quantization logic 20, and entropy encoder logic 22 to encode and compress the shifted pixel data in a manner known in the art.

The above described process to first decode the downsampled pixel data, then perform the fractional pel shift, and then encode the pixel data including the shifted chrominance values is computationally expensive. In fact, the steps in the process of FIG. 3 of the forward discrete cosine transform (FDCT) 20 and inverse discrete cosine transform (IDCT) operations are particularly computationally expensive. The FDCT 20 operation decomposes the pixel data into a scaled set of cosine basis functions, or a set of waveforms, where many of the coefficients become zero after quantization. The IDCT 12 operation involves reconstructing the set of pixel samples from the transform coefficients. The quantization operation 18 involves further reduction of the accuracy in the DCT coefficients by converting the DCT coefficients to integer values.

The described implementations improve the performance of the JPEG encoding and decoding operations on data subject to fractional shifting by completely eliminating the need to perform FDCT and quantization operations, as well as the IDCT and dequantization operations.

Fractional Pel Shifting In the DCT Transform Domain

Figure 4:
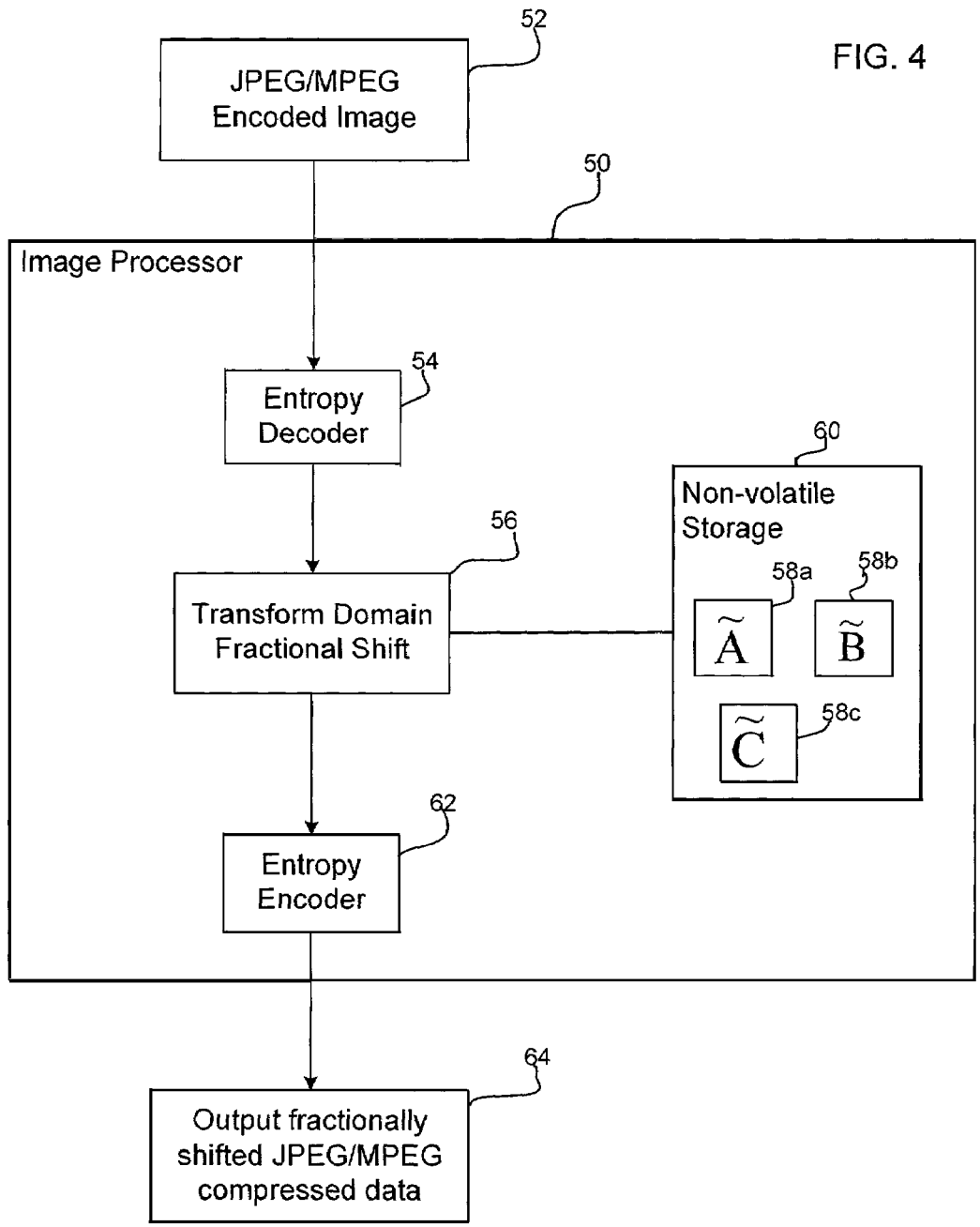
FIG. 4 illustrates an architecture for performing a fractional shift on JPEG/MPEG encoded data in accordance with implementations of the invention.

FIG. 4 illustrates the components included in a digital image processor 50 that is capable of receiving a JPEG/MPEG encoded image 52 subject to chrominance down sampling. An entropy decoder 54 performs entropy decoding on the image 52 in a manner known in the art. A transform domain fractional shift unit 56 then transforms the entropy decoded image, that is a block of quantized DCT coefficients and outputs a quantized DCT block that has been subject to a fractional pel shift operation. To perform the fractional shift transformation, the transform domain fractional shift unit 56 utilizes three transform matrices $\tilde{A}$ 58a, $\tilde{B}$ 58b, and $\tilde{C}$ 58c in a non-volatile storage 60. The three matrices 58a, b, c are constructed as follows. First a matrix "D" representing the one-dimensional Forward Discrete Cosine Transform (FDCT) operator is provided. The matrix D includes entries $D_{i,j}$ where i and j indicate the row and column position, respectively, of the entry. Each entry $D_{i,j}$ is calculated according to equation (5) as follows:

$$D_{i,j} = \left(C_j \cdot \cos\left[\frac{(2i+1)\pi \cdot j}{16}\right]\right) \text{ for } i = 0, 1, \ldots 8; j = 0, 1, \ldots, 8 \quad (5)$$

The variable $C_j$ is equal to:
½ if j>0;

$$\frac{1}{2\sqrt{2}} \text{ if } j = 0.$$

The fractional shifting matrices $\tilde{A}$ 58a, $\tilde{B}$ 58b, and $\tilde{C}$ 58c are calculated as follows, according to equations (6), (7), and (8) below:

$$\tilde{A} = D \cdot A \cdot D^T \quad (6)$$

$$\tilde{B} = D \cdot B \cdot D^T \quad (7)$$

$$\tilde{C} = D \cdot C \cdot D^T \quad (8)$$

In the description herein a letter X representing a matrix with a tilde ("~"), i.e., $\tilde{X}$, signifies a vector or matrix of DCT coefficients for the vector X. The D matrix represents the forward DCT operator and the matrix $D^T$ is the transpose of D. The matrices A, B, C used in equations (6), (7), and (8) are the matrices shown in FIG. 2 that perform the fraction shift operation. The resulting matrices $\tilde{A}$ 58a, $\tilde{B}$ 58b, and $\tilde{C}$ 58c comprise the two-dimensional FDCT of A, B, and C, respectively, where the matrix multiplication operation involving D transforms each column and the matrix multiplication operation involving $D^T$ transforms each row.

In certain implementations, the transform domain fractional shift unit 56 performs a fractional shift of quantized DCT coefficients directly in the DCT transform domain without having to transform the data back to the real domain by performing a dequantization and IDCT operation prior to fractional shifting and then a FDCT and quantization of the fractional shifted data back to the DCT transform domain. The transform domain fractional shift unit 56 includes logic to shift the already quantized DCT coefficients with the following equations (9) and (10) below:

$$\tilde{H}_k = \tilde{A} \cdot \tilde{G}_k + \tilde{B} \cdot \tilde{G}_{k+1} \text{ for } k = 1 \ldots (m-1) \quad (9)$$

$$\tilde{H}_k = \tilde{C} \cdot \tilde{G}_k, \text{ where } k = m. \quad (10)$$

Thus, the transform domain fractional shift unit 56 performs a fractional shift operation directly on the quantized DCT data $\tilde{G}$ from the original compressed image, i.e., the data in the DCT transform domain, by using the fractional shift matrices $\tilde{A}$ 58a, $\tilde{B}$ 58b, and $\tilde{C}$ 58c stored in the non-volatile memory 60 and each block $\tilde{G}_k$ of the row (column) $\tilde{G}$ comprising the actual quantized, DCT data. Thus, the image processing unit 56 can perform the fractional shift using simple matrix multiplication and without having to return to the real domain and then back again to the DCT transform domain by performing both full decoding and full encoding of the data as shown in FIG. 3 of the prior art.

The equations (9) and (10) that are used by the image processing unit 56 are derived as follows. As discussed above, the fractional shift operation involves equations (1) and (2) above using the fractional shift matrices A, B, C shown in FIG. 2 to produce the matrix H of fractionally shifted data with the fractional shift matrices. Application of the one-dimensional FDCT matrix D on the shifted H calculated according to equations (1) and (2) above results in equations (11) and (12) below:

$$D \cdot H_k = D \cdot A \cdot G_k + D \cdot B \cdot G_{k+1} \text{ for } k=1 \ldots (m-1) \quad (11)$$

$$D \cdot H_m = D \cdot C \cdot G_m, \text{ where } k=m. \quad (12)$$

The matrix D of the one-dimensional FDCT operators is by definition an orthogonal matrix, such that the principle of equation (13) hold true.

$$D \cdot D^T = D^T \cdot D = I_8 \quad (13),$$

where D is an 8×8 matrix and $I_m$ is the identity matrix. Multiplying the identity matrix by any matrix returns that matrix. Because of this property, the matrix $D^T \cdot D$ can be distributed into equations (11) and (12) as shown in parenthesis in equations (14) and (15) below:

$$D \cdot H_k = D \cdot A \cdot (D^T \cdot D) \cdot G_k + D \cdot B \cdot (D^T D) \cdot G_{k+1}, \text{ for } k=1 \ldots (m-1) \quad (14)$$

$$D \cdot H_k = D \cdot C \cdot (D^T D) \cdot G_k, \text{ where } k=m. \quad (15)$$

Equations (16) and (17) below comprise equations (14) and (15) with the parenthesis redistributed to show that equations (14) and (15) can be used to derive equations (9) and (10) used by the transformation unit 56.

$$D \cdot H_k = (D \cdot A \cdot D^T) \cdot (D \cdot G_k) + (D \cdot B \cdot D^T) \cdot (D \cdot G_{k+1}), \text{ for } k=1 \ldots (m-1) \quad (16)$$

$$D \cdot H_k = (D \cdot C \cdot D^T) \cdot (D \cdot G_k), \text{ where } k=m. \quad (17)$$

With respect to equation (16), using equations (6) and (7) above, $(D \cdot A \cdot D^T)$ can be replaced with the transform matrix $\tilde{A}$ and $(D \cdot B \cdot D^T)$ can be replaced with the transform matrix $\tilde{B}$. Further, in equation (16), $D \cdot G_k$ can be replaced with $\tilde{G}_k$, which are the DCT coefficients of the original data and $D \cdot H_k$ can be replaced with $\tilde{H}_k$, the DCT coefficients of the fractional shifted data. The result of these equivalent substitutions into equation (16) is equation (9) above used by the image processing unit 56.

Similarly, with respect to equation (17), $(D \cdot C \cdot D^T)$ can be replaced with the transform matrix $\tilde{C}$ and $D \cdot G_m$ can be replaced with $\tilde{G}_m$, which is the DCT matrix of the last block. The result of these equivalent substitutions into equation (17) is equation (10) above used by the image processing unit 56.

Equation (9) and (10) describe one algorithmic implementation of transform domain fractional shift processing which assumes that the last sample in the row or column being fractionally shifted remains fixed as the last sample after the shift (collocation). In further implementations, collocation takes place on the first sample in each row or column which would yield equations similar to those in equations (i) and (10). In yet further implementations, the shift is accomplished by replicating the last sample and applying equation (9) for k=1, . . . , m according to equation (18) below:

$$\tilde{G}_{m+1} = D G_{m+1} D^T, \text{ where } G_{m+1} = (G_{m,8}, 0, 0, \ldots, 0) \quad (18)$$

Additionally, one could assume replication of the first sample in the first block to be fractionally shifted and proceed similarly to drive a different implementation.

Furthermore, the above implementations are not restricted to the four specific fractional shift algorithms described above. In fact, the method described above can be applied to any fractional shift algorithm which can be expressed as a linear system of equations. Additionally, the process of developing transform domain fractional shift algorithms can be implemented to develop algorithms for fractionally shifting any transformed data, $\tilde{S}$, which is obtained through a matrix operation of equation (19) below:

$$\tilde{S} = MSM^T \quad (19)$$

Where S is the real data set which is to be fractionally shifted and M is an orthogonal matrix, e.g., $M^T M = MM^T = I$.

Figure 6:
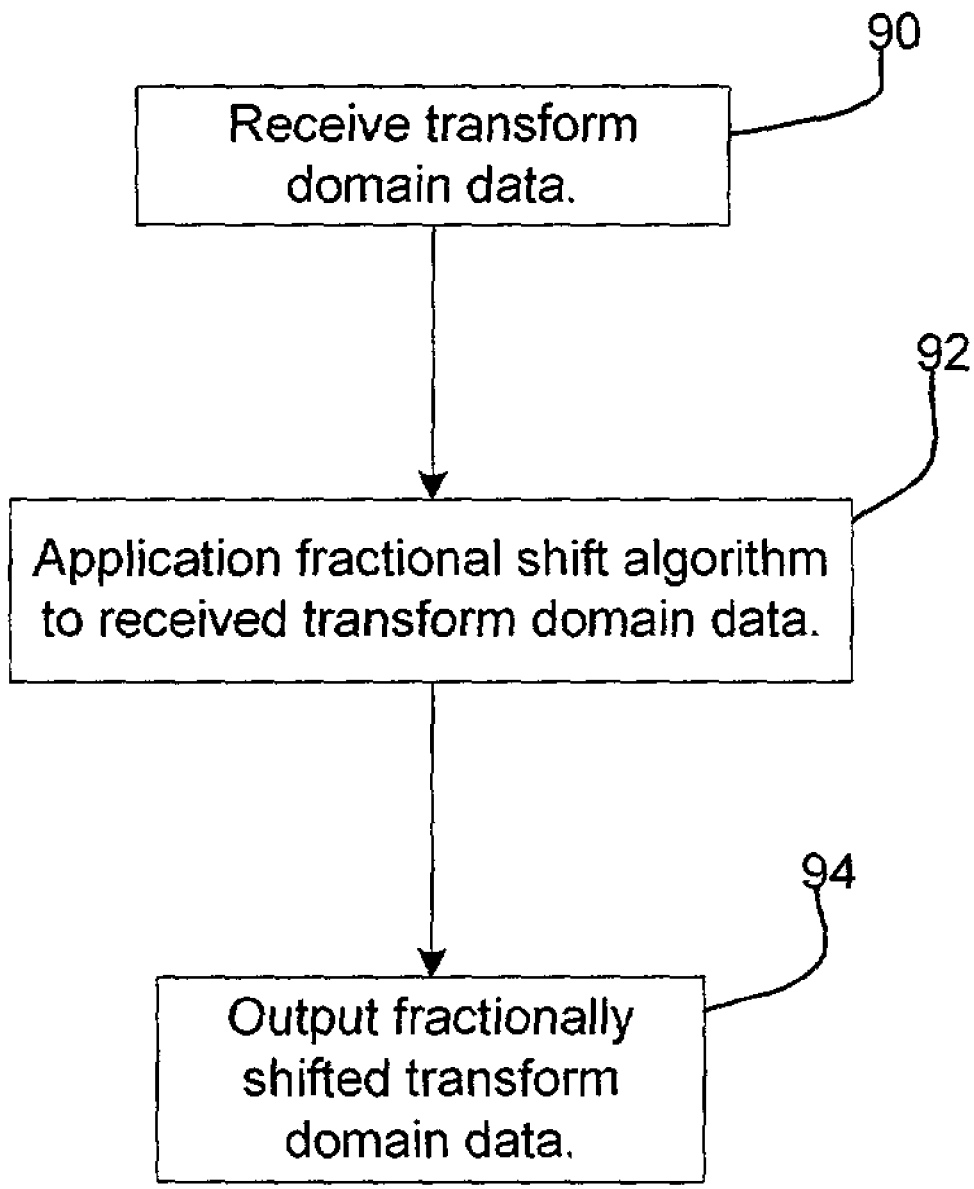
FIG. 6 illustrates one implementation of logic for shifting data in accordance with implementations of the invention.

FIG. 6 illustrates the general operation where a transform domain data is received (at block 90). The received transform domain data is then directly fractionally shifted (at block 92) using the algorithm. As discussed, in certain implementations, the transform occurs without having to inverse transform the domain data before the fractional shift and then again forward transform the fractionally shifted data. The fractionally shifted domain data is then outputted (at block 94)

Furthermore, it is possible to include de/re quantization factors as follows. Assuming that $q_1 = (q_{11}, \ldots q_{18})$ is the quantization vector corresponding to incoming row (column) vectors $G_1, \ldots, G_m$, and that $q_2 = (q_{21}, \ldots, q_{28})$ is the quantization vector corresponding to outgoing rows (columns) $H_1, \ldots, H_m$, then dequantization (component-wise multiplication of $G_i$ by $q_i$) and requantization (prerounding) (component-wise division of $H_i$ by $q_2$) can be simultaneously accomplished by component-wise multiplication of matrices $\tilde{A}, \tilde{B}, \tilde{C}$ and the quantization matrix 80 shown in FIG. 5. The outgoing row (column) vector can then be rounded (component-wise) to complete the requantization process.

The image processor 50 further includes an entropy encoder 62 (FIG. 4) to encode the quantized DCT coefficients of the fractional pel shifted data produced by the transformation logic 56.

Figure 7:
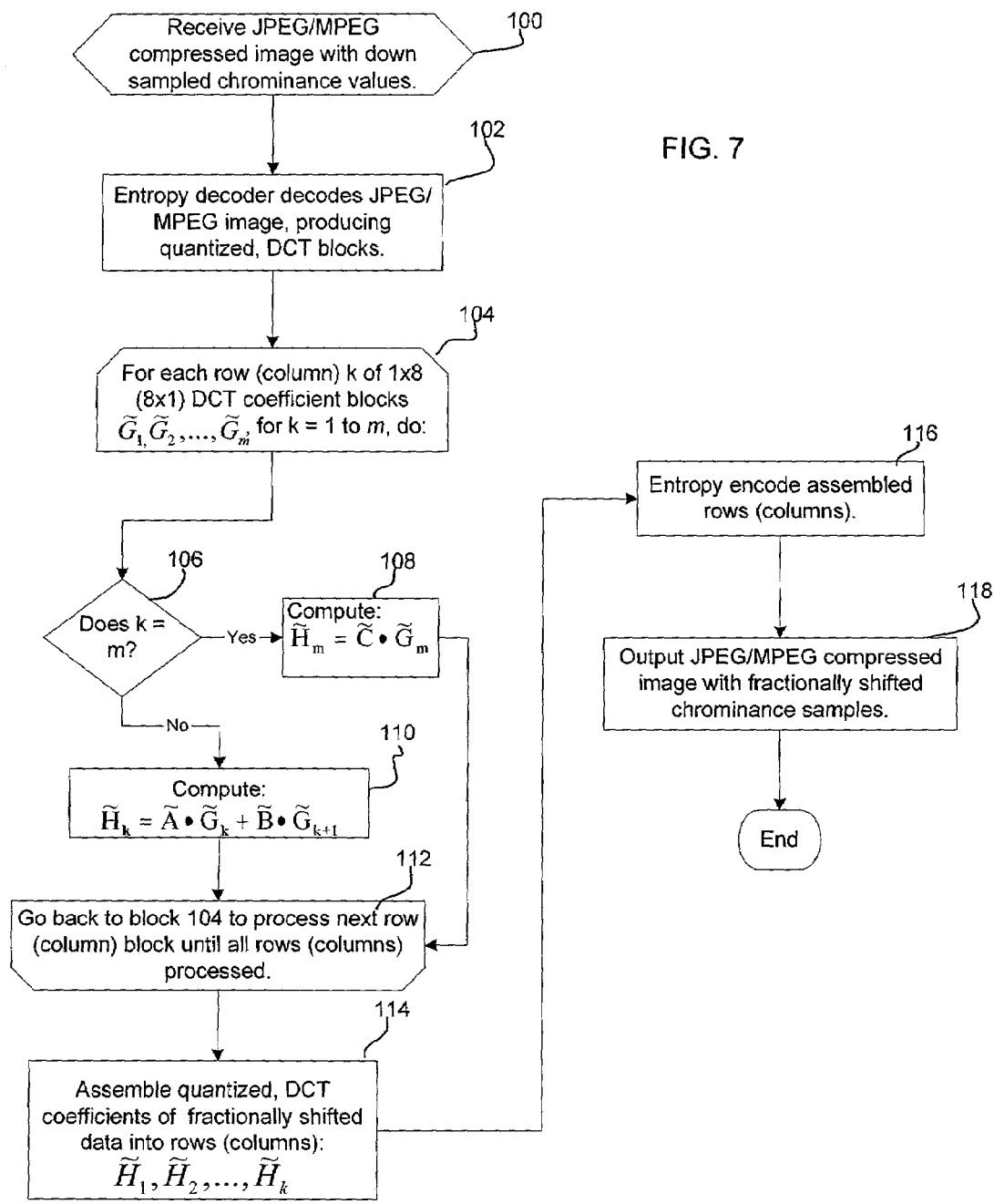
FIG. 7 illustrates logic implemented in the architecture of FIG. 4 for performing a fractional shift in accordance with implementations of the invention.

FIG. 7 illustrates logic implemented in hardware or software logic in the image processor 50 to fractionally shift a JPEG or MPEG encoded image 52 without having to perform dequantization and IDCT and then FDCT and quantization as shown in the prior art technique of FIG. 3. Control begins at block 100 with the image processor 50 receiving a JPEG/MPEG compressed image 52 whose pixel data has downsampled chrominance values. The entropy decoder 54 performs (at block 102) an entropy decoding operation known in the art on the JPEG/MPEG image 52 to produce the quantized DCT coefficients of the JPEG/MPEG image. For each kth 1×m row (or m×1 column) of DCT coefficient blocks $\tilde{G}_1, \tilde{G}_2, \ldots \tilde{G}_m$, for k=1 to m, where m is the row (column) block size of the JPEG/MPEG encoded image, the transform domain fractional shift unit 56 performs a loop at blocks 104 through 112. If (at block 106) k equals m, i.e., the last row (column) is being considered, then the transform domain fractional shift unit 56 accesses the fractional shifting matrices 58a, 58b, and/or 58c including DCT coefficients from the non-volatile memory 60 and calculates (at block 108) $\tilde{H}_m$ using equation (10) above. As discussed, $\tilde{H}_k$ comprises the DCT coefficients of the fractionally shifted pixel data. If (at block 106) k is not equal to m, then the transform domain fractional shift unit 56 performs (at block 110) the fractional pel shift on the next quantized DCT vector $\tilde{G}_k$ using equation (9). If there are further rows (columns) to process, then control proceeds (at block 112) back to block 104 to process the next row (column). After performing the shift on all rows (columns), the transformation logic 56 assembles (at block 114) all the fractional shifted vectors $\tilde{H}_1, \tilde{H}_2, \ldots, \tilde{H}_m$. The entropy encoder 62 then entropy encodes (at block 116) the assembled block $\tilde{H}$. The JPEG/MPEG compressed image with the fractionally shifted chrominance values 64 (FIG. 4) is then outputted (at block 118). The operation at blocks 100 through 118 may be performed for multiple blocks in the received JPEG/MPEG image 52. The output 64 is a JPEG/MPEG image whose chrominance values were fractionally shifted.

The image processor 50 may be implemented in digital hardware, such as an ASIC. In such case, the non-volatile storage 60 maintaining the fractional shifting matrices 58a, b, c may be implemented in the hardware circuitry of the image processor 40 or within a separate read-only memory device (e.g., ROM, programmable ROM (PROM), electronically erasable PROM (EEPROM), etc.) that is accessible to the image processor 50. Alternatively, the image processor 50 logic may be implemented as software code that is executed by a processor. In such software implementations, the fractional shifting matrices 58a, b, c can be stored in a non-volatile memory device or within one or more files on a magnetic medium, such as a hard disk drive. The non-volatile storage 60 may store the three fractional shifting matrices 58a, b, c for different fractional shift factors γ.

In certain implementations, the image processor 50 may be implemented within a printer to perform fractional shifting on data that has been subject to downsampling as described above. In certain printer implementations, the data stream received by the printer may include certain commands instructing the image processor 50 to perform fractional shifting on the pixel data at a specified shift factor γ. In cases where there are fractional shift matrices for different shift factors γ, the image processor 50 would select the matrices implementing the fractional shift transform for the requested shift factor γ. In further implementations, the image processor 50 can be utilized in other types of devices that render images, such as an image viewer program, video card rendering output for a display monitor, etc. Still further, the output factional pel shifted JPEG image may be outputted to a storage device for later access.

Additional Implementation Details

The described image processor may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

Preferred embodiments were described with respect to transforming image data comprised of pixels. The image data may comprise still images or motion pictures. In alternative embodiments, the data stream subject to the transformation of the preferred implementations may comprise other types of data than image data.

The described implementations concerned a fractional shift transformation. However, the described transformation process may be applied to other transformations of data, whenever the transform is of the form given in equation (18) described above. In such case, a forward transform operation would be performed on the one or more transformation matrices to allow the transformation to be performed directly on the transform coefficients of the input data.

In implementations where the original data is downsampled, any down sampling technique known in the art may be used.

The described implementations concerned fractional pel shifting of JPEG data. However, the methods of the described implementations may apply to other compression schemes that utilize DCT operations as part of the compression process.

Still further, the described implementations are applicable to compression schemes that utilize other transformations, as long as the transformation is of the form of equation (18), discussed above. Transform equations can be derived by using the properties of the transform to generate the matrices which will perform the desired fractional shift operations in the transform domain.

Certain implementations were described with respect to performing the transform domain fractional shift on an 8×8 block of image data. However, the transform domain fractional shift described herein may be performed with respect to different m×n block sizes of image data through utilization of m×n matrices.

The described implementations concerned manipulation of transformed image data. However, the described implementations may be used to fractionally shift any type of transformed data, not just multimedia data.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for performing a fractional shift of transformed image data, comprising:
providing three fractional shift transform matrices $\tilde{A}$, $\tilde{B}$, and $\tilde{C}$ in non-volatile storage that are capable of fractionally shifting image data by a shift factor;
receiving the transformed image data; and
applying the three fractional shift transform matrices $\tilde{A}$, $\tilde{B}$, and $\tilde{C}$ to vectors $\tilde{G}_1, \tilde{G}_2, \ldots, \tilde{G}_m$ of the transformed image data to generate output transformed image data in an output device that is fractionally shifted by the shift factor without inverse transforming the transformed image data, wherein the output transformed image data is generated using two functions comprising:

$$\tilde{H}_k = \tilde{A} \cdot \tilde{G}_k + \tilde{B} \cdot \tilde{G}_{k+1} \text{ for } k=1, 2, \ldots, m-1$$

$$\tilde{H}_k = \tilde{C} \cdot \tilde{G}_k \text{ for } k=m,$$

wherein the output transformed image data comprises an m×m matrix of the vectors $\tilde{H}_1, \tilde{H}_2, \ldots, \tilde{H}_m$.

2. The method of claim 1, wherein the transformed image data includes image data that has been downsampled.

3. The method of claim 1, wherein the shift factor is between zero and one.

4. The method of claim 1, wherein the non-volatile storage includes matrices having different shift factors to perform the fractional pel shift at different shift factors.

5. The method of claim 1, wherein the transformed image data is transformed by applying a Forward Discrete Cosine Transform (FDCT) to an input data stream.

6. The method of claim 5, wherein the input data stream was encoded performing entropy encoding after applying the FDCT and quantization.

7. The method of claim 6, further comprising:
entropy decoding the received encoded image data before applying the at least one fractional shift transform matrix; and
entropy encoding the output fractionally shifted transformed image data, wherein the transformed image data to which the three transformed matrices are applied comprises the entropy decoded encoded image data.

8. The method of claim 7, wherein the fractional shift is collocated on a first data point in the encoded data to fractionally shift the image data.

9. The method of claim 1, wherein the transform matrices $\tilde{A}$, $\tilde{B}$, and $\tilde{C}$ are modified to accomplish dequantization and requantization of the vectors $\tilde{G}_1, \tilde{G}_2, \ldots, \tilde{G}_m$ and $\tilde{H}_1, \tilde{H}_2, \ldots, \tilde{H}_m$, respectively.

10. The method of claim 1, wherein each fractional shift transform matrix is generated by applying a two-dimensional Forward Discrete Cosine Transform (FDCT) to a fractional shift matrix including the shift factors.

11. The method of claim 1, wherein the received and output encoded image data is encoded using one of the Joint Photographic Experts Group (JPEG) or Moving Pictures Expert Group (MPEG) compression techniques.

12. The method of claim 1, wherein the steps of providing the at least one transformed matrix, receiving the input data stream, and applying the at least one transformed matrix are performed by a printer.

13. The method of claim 1, further comprising:
decoding the output encoded image data; and
rendering the decoded image data on an output device.

14. The method of claim 13, wherein the output devices is a member of a set of output devices comprising a printer, display monitor, and storage.

15. The method of claim 1, wherein the fractional shift matrix is modified to accomplish dequantization and requantization of the transformed image data without inverse transforming the transformed image data.

16. A system for performing a fractional shift of transformed image data in communication with an output device, comprising:

a non-volatile storage;
three fractional shift transform matrices represented in the non-volatile storage that are capable of fractionally shifting image data by a shift factor;
means for receiving the transformed image data;
means for applying the three fractional shift transform matrices $\tilde{A}$, $\tilde{B}$, and $\tilde{C}$ to vectors $\tilde{G}_1, \tilde{G}_2, \ldots, \tilde{G}_m$ of the transformed image data to generate output transformed image data for the output device that is fractionally shifted by the shift factor without inverse transforming the transformed image data, wherein the output transformed image data is generated using two functions comprising:

$\tilde{H}_k = \tilde{A} \cdot \tilde{G}_k + \tilde{B} \cdot \tilde{G}_{k+1}$ for $k=1, 2, \ldots, m-1$ $\tilde{H}_k = \tilde{C} \cdot \tilde{G}_k$ for $k=m$, wherein the output transformed image data comprises an mxm matrix of the vectors $\tilde{H}_1, \tilde{H}_2, \ldots, \tilde{H}_m$.

17. The system of claim 16, wherein the transformed image data includes image data that has been downsampled.

18. The system of claim 16, wherein the shift factor is between zero and one.

19. The system of claim 16, wherein the non-volatile storage includes matrices having different shift factors to perform the fractional pel shift at different shift factors.

20. The system of claim 16, wherein the transformed image data is transformed by applying a Forward Discrete Cosine Transform (FDCT) to an input data stream.

21. The system of claim 20, wherein the input data stream was encoded performing entropy encoding after applying the FDCT and quantization.

22. The system of claim 21, further comprising:
means for entropy decoding the received encoded image data before applying the at least one fractional shift transform matrix; and
means for entropy encoding the output fractionally shifted transformed image data wherein the transformed image data to which the three transformed matrices are applied comprises the entropy decoded encoded image data.

23. The system of claim 16, wherein each fractional shift transform matrix is generated by applying a two-dimensional Forward Discrete Cosine Transform (FDCT) to a fractional shift matrix including the shift factors.

24. The system of claim 16, wherein the steps of providing the at least one transformed matrix, receiving the input data stream, and applying the at least one transformed matrix are performed by a printer.

25. The system of claim 16, further comprising:
decoding the output encoded image data; and
rendering the decoded image data on an output device.

26. The system of claim 25, wherein the output devices is a member of a set of output devices comprising a printer, display monitor, and storage.

27. The system of claim 16, wherein the fractional shift matrix is modified to accomplish dequantization and requantization of the transformed image data without inverse transforming the transformed image data.

28. An article of manufacture including code for performing a fractional shift of transformed image data, wherein the code causes communication with an output device and non-volatile storage and operations to be performed, the operations comprising:
providing three fractional shift transform matrices $\tilde{A}$, $\tilde{B}$, and $\tilde{C}$ in non-volatile storage that are capable of fractionally shifting image data by a shift factor;

receiving the transformed image data;
applying the fractional shift transform matrix to the transformed image data to generate output transformed image data that is fractionally shifted by the shift factor without inverse transforming the transformed image data; and
means for applying the three fractional shift transform matrices $\tilde{A}$, $\tilde{B}$, and $\tilde{C}$ to vectors $\tilde{G}_1, \tilde{G}_2, \ldots, \tilde{G}_m$ of the transformed image data to generate output transformed image data for the output device that is fractionally shifted by the shift factor without inverse transforming the transformed image data, wherein the output transformed image data is generated using two functions comprising:

$\tilde{H}_k = \tilde{A} \cdot \tilde{G}_k + \tilde{B} \cdot \tilde{G}_{k+1}$ for $k=1, 2, \ldots, m-1$ $\tilde{H}_k = \tilde{C} \cdot \tilde{G}_k$ for $k=m$, wherein the output transformed image data comprises an mxm matrix of the vectors $\tilde{H}_1, \tilde{H}_2, \ldots, \tilde{H}_m$.

29. The article of manufacture of claim 28, wherein the transformed image data includes image data that has been downsampled.

30. The article of manufacture of claim 28, wherein the shift factor is between zero and one.

31. The article of manufacture of claim 28, wherein the non-volatile storage includes matrices having different shift factors to perform the fractional pel shift at different shift factors.

32. The article of manufacture of claim 28, wherein the transformed image data is transformed by applying a Forward Discrete Cosine Transform (FDCT) to an input data stream.

33. The article of manufacture of claim 32, wherein the input data stream was encoded performing entropy encoding after applying the FDCT and quantization.

34. The article of manufacture of claim 33, further comprising:
entropy decoding the received encoded image data before applying the at least one fractional shift transform matrix; and
entropy encoding the output fractionally shifted transformed image data, wherein the transformed image data to which the three transformed matrices are applied comprises the entropy decoded encoded image data.

35. The article of manufacture of claim 34, wherein the fractional shift is collocated on a first data point in the encoded image data to fractionally shift the image data.

36. The article of manufacture of claim 28, wherein the transform matrices $\tilde{A}$, $\tilde{B}$, and $\tilde{C}$ are modified to accomplish dequantization and requantization of the vectors $\tilde{G}_1, \tilde{G}_2, \ldots, \tilde{G}_m$ and $\tilde{H}_1, \tilde{H}_2, \ldots, \tilde{H}_m$, respectively.

37. The article of manufacture of claim 28, wherein each fractional shift transform matrix is generated by applying a two-dimensional Forward Discrete Cosine Transform (FDCT) to a fractional shift matrix including the shift factors.

38. The article of manufacture of claim 28, wherein the received and output encoded image data is encoded using one of the Joint Photographic Experts Group (JPEG) or Moving Pictures Expert Group (MPEG) compression techniques.

39. The article of manufacture of claim 28, wherein the steps of providing the at least one transformed matrix, receiving the input data stream, and applying the at least one transformed matrix are performed by a printer.

40. The article of manufacture of claim 28, further comprising:
  decoding the output encoded image data; and
  rendering the decoded image data on an output device.

41. The article of manufacture of claim 40, wherein the output devices is a member of a set of output devices comprising a printer, display monitor, and storage.

42. The article of manufacture of claim 28, wherein the fractional shift matrix is modified to accomplish dequantization and requantization of the transformed image data without inverse transforming the transformed image data.

* * * * *